Patented June 10, 1947

2,422,172

UNITED STATES PATENT OFFICE 2,422,172

THERMOSTABLE CATALYSTS FOR THE DEHYDROGENATION OF HYDROCARBONS

Albert E. Smith and Otto A. Beeck, Berkeley, Calif., assignors to Shell Development Company, San Francisco, Calif., a corporation of Delaware No Drawing. Application July 28, 1942, Serial No. 452,656

16 Claims. (Cl. 196—50)

This invention relates to new and improved catalysts and a process for their preparation. The invention furthermore relates to improvements in catalytic conversion processes such, in particular, as dehydrogenation and hydroforming, by the use of the new and improved catalysts.

An object of the invention is to provide new alumina-base catalysts of improved thermal stability which may be employed in various processes over long periods of time with a minimum loss in catalytic activity. A further object of the invention is to provide new and improved catalysts which may be subjected to higher temperatures without loss in catalytic activity and are especially advantageous for use in processes involving periodic regeneration of the catalyst by burning carbonaceous deposits therefrom. A further object of the invention is to provide a method for the practical production of such catalysts. A still further object of the invention is to provide improved catalytic conversion processes, particularly of the regenerative type.

The catalysts of the invention consist essentially of a particular subclass of adsorptive beta aluminas in combination with one or more known catalytic promoters. They are prepared according to the process of the invention by converting an adsorptive gamma alumina to the particular adsorptive beta aluminas under certain prescribed conditions with certain alkaline earth metal compounds and promoting the adsorptive beta aluminas with certain catalytic metal compounds.

In recent years great progress has been made in the execution of various conversions by the application of solid catalysts. It has been found that nearly all of the known inorganic compounds are capable of catalyzing one conversion or another. Although there are notable exceptions, the large majority of the more active catalysts are found among the metals and their compounds. Many of these, such in particular as the metals capable of existing in a plurality of valence states, are capable of catalyzing a number of different conversions, especially if they are used in various combinations. Of the many catalytic compounds, the oxides, sulfides and halides are generally the most active, but many other compounds, such as the chromates, chromites, tungstates, molybdates, phosphates, phosphites, borates, etc., are not infrequently employed.

A great many of these elements and compounds known to have catalytic properties have one or more undesirable characteristics such as small available surface per unit volume, insufficient mechanical strength, thermal instability, lack of availability, etc., which make them unfit for practical application in their usual form. These catalytic agents may often be employed very advantageously, however, if they are applied to a suitable carrier or supporting material. Also, nearly all of the catalytic agents which are, per se, suitable catalysts are greatly improved when applied on a suitable carrier or support.

The primary function of the carrier is to increase the available catalytic surface. In conversions executed with the aid of solid catalysts, the reactions take place predominantly at the fluid-solid interface. This is indicated by the fact that at temperatures above a certain threshold temperature, the reaction rate is more or less proportional to the available catalyst surface in the reaction zone. It is known that certain substances have, besides the usual exterior surface, a minute porous structure, and have therefore a large inner surface. Substances having large inner surfaces are generally active, i. e. adsorptive, and it can be shown that the adsorption ability of such solids is generally more or less proportional to the inner surface. When the various catalytic agents are deposited upon such carrying materials, an enormous catalytic surface is provided and catalysts of much superior activity are produced.

A great number of substances having large available surfaces have been used or suggested as supports for various catalytic promoters. Of the numerous carrier materials available, alumina, due to its marked superiority in certain respects, is a particularly excellent carrier. It is widely used to support catalytic agents of the most varied types. The superiority of alumina over most other carrier materials is due largely to its superior stabilizing and promoting properties in combination with a large inner surface, moderately good thermal stability, and availability. Alumina, it is found, is especially effective in stabilizing the activity of catalytic promoters deposited thereon. According to A. Mittasch and E. Keunecke [Z. Elektrochem. 38, 666 (1932)], the stabilizing effect of alumina is due primarily to the fact that the somewhat porous interlayers of alumina prevent the recrystallization or sintering of the active catalyst. It has recently been found that alumina carriers frequently act as true catalyst promoters for many catalytic agents, such in particular as metal oxides. An excellent example of such promoter is, for instance, the promotion of chromium oxide by alumina. Chromium oxide deposited on active alumina is over twice as active as the same chromium oxide deposited upon silica gel, notwithstanding the fact that the inner surface of the silica gel is much larger than that of the active alumina.

Although alumina is recognized as a catalyst for a number of conversions and is an excellent carrier for a large variety of catalytic promoters, it is well known that not all aluminas are equivalent and that some are not suitable. The aluminas employed as catalysts and as supports are usually activated, i. e. adsorptive, aluminas. Precipitated aluminas contain considerable amounts of combined water and have little or no available inner surface. By suitably heating the alumina to drive out a portion of the water, small pores are opened up in the interior, and it becomes adsorptive. It is then said to be activated. Alpha alumina, for example, which is the corundum form, contains little or no inner surface, cannot be activated, and is entirely unsuitable. Also, the alumina beta mono-hydrate, which has never been synthetically prepared but occurs in nature as the mineral, diaspore, is likewise very inferior. The alumina beta monohydrate, diaspore, has little adsorptive capacity and, if heated to drive off part of its water, it is converted directly to inactive alpha alumina. Suitable activated aluminas, on the other hand, may be prepared from the gamma aluminas of the Haber system. Haber [Naturwiss 13, 1007 (1925)] classifies the various forms of alumina into two systems designated by him as the gamma and beta systems, according to their behavior upon heating. The gamma aluminas of the Haber classification comprise gamma alumina and all of the so-called hydrated aluminas which, upon heating, are converted to alpha alumina through the gamma form. The beta aluminas of the Haber system of classification comprise those aluminas such as diaspore which, upon heating, are converted directly to alpha alumina without going through the gamma form. The classification of aluminas into two systems, designated gamma and beta, according to Haber is not to be confused with the fundamental true alumina forms. This classification is merely for the purpose of dividing the common forms of alumina into two distinct groups. Thus, the various so-called hydrated aluminas which are classified as belonging to the gamma system in the Haber classification are totally distinct from the true gamma alumina, and diaspore is not a beta alumina. The aluminas which, upon heating are converted into alpha alumina through gamma alumina and belong to the gamma system of the Haber classification are:

The alumina alpha trihydrate, known as gibbsite or hydrargillite. This form is readily prepared synthetically and occurs in nature in the mineral, gibbsite, and as a component of certain bauxites;

The alumina beta trihydrate, known also as bayerite. It is isomorphous with hydrargillite. It does not occur naturally, but may be prepared synthetically by proper control of the precipitation conditions;

The alumina alpha monohydrate, known as böhmite. This alumina is formed by the partial dehydration of either of the above two trihydrates;

*Gamma alumina.*—This is a meta-stable anhydrous oxide which does not occur naturally, but may be prepared by carefully controlled dehydration of any of the first three mentioned hydrates;

*Gelatinous aluminum hydroxide.*—This frequently encountered alumina is amorphous when freshly precipitated, but after aging the characteristic lines of böhmite can be detected by X-ray analysis. On further aging, the precipitate is gradually transformed to bayerite and finally to hydrargillite;

*Bauxite.*—This ore is of varied composition. The term "bauxite" was used in the older literature to designate the dihydrate. It is now known that bauxite consists of an extremely finely divided mixture of two or more of the known aluminas and certain argillaceous residues. No dihydrates of aluminas have ever been observed.

It is to be noted that the terms "alumina beta monohydrate," "alumina alpha monohydrate," etc., have no relation to the terms "beta alumina" and "alpha alumina." Thus, the alpha hydrate forms are not alpha alumina in any sense and the beta hydrate is not beta alumina. It is also to be noted that the various water-containing forms of alumina are referred to herein in the conventional manner as "hydrates," even though it is generally known that the water in these so-called hydrates does not exist in the form of hydrated water, but in the form of hydroxyl water.

It will be appreciated from the above considerations that the various activated, i. e. adsorptive, aluminas hitherto employed in catalysis consist essentially of böhmite (alumina alpha monohydrate). More recently, it has been found that gamma alumina, which is prepared by complete dehydration, is superior to alumina alpha monohydrate in catalysts for certain purposes. During use the alumina alpha monohydrate, if this is employed in preparing the catalyst, is often converted to gamma alumina. This transformation is, howeveer, in no way detrimental.

These various activated aluminas, when used as catalysts either per se or in combination with various catalytic promoters, gradually decline in activity. In most cases the decline in activity is relatively slow. In certain cases, however, especially when the activated alumina is employed in processes at relatively high temperatures and/or in combination with certain catalytic promoters, the decline in catalytic activity is much more rapid. In spite of their otherwise desirable properties, these alumina-base catalysts have therefore been somewhat restricted in their use. We have found that this decline in catalytic activity of these alumina-base catalysts is often due largely to the gradual transformation of the alumina from the gamma alumina form to inactive alpha alumina.

Gamma alumina is thermodynamically unstable:

$$\text{Gamma } Al_2O_3 \rightarrow \text{Alpha } Al_2O_3 + 7800 \text{ Cal.}$$

This transformation takes place rapidly only at temperatures in the order of 900° C.–1100° C. or above. At lower temperatures such as are commonly employed in catalytic processes, the conversion is quite slow, but nevertheless takes place over extended periods of time. We have, furthermore, found that many of the catalytic promoters commonly employed in conjunction with the alumina accelerate this transformation and cause it to be consummated at appreciable rates, even at relatively low temperatures. We have found that this property of accelerating the transformation of the gamma alumina to alpha alumina is particularly pronounced in the case of catalytic promoters which are isomorphous with alpha alumina. Thus, the oxides of chromium, manganese, iron and cobalt, which are isomorphous with alpha alumina are particularly effective in accelerating this transformation. This undesired transformation is also accelerated by the presence of acid vapors such, in particular, as vapors of $MoO_3$.

We have now prepared new and improved alumina catalysts which retain the desirable properties of gamma alumina but are much more stable. The catalysts of the present invention are prepared with a particular type of beta alumina. The beta aluminas presently to be described, unlike gamma alumina, are stable and are not converted into alpha alumina, even at high temperatures. Furthermore, they are relatively unaffected by the presence of promoters which are isomorphous with alpha alumina, or by acid vapors such as $MoO_3$. These beta aluminas do not occur naturally as far as known and are not at present available commercially. They are known to form, however, under certain drastic conditions. The beta aluminas formed in this way, however, have very low surfaces and are, for several reasons, unsuited for use in catalysis. We have now discovered that beta aluminas of the type in question may be prepared in a very suitable form, and that in such form they are superior to the hitherto-employed adsorptive aluminas in catalysis.

There are several beta aluminas capable of existence. Their structural and chemical characteristics and their relation to gamma alumina will be apparent from the following:

Gamma alumina is one of the class of compounds with a cubic close packing of the anions with the cations in the interstices between the anion spheres. Gamma alumina differs, however, from most compounds of this type in having on the average 2/3 of the 8(f) and 16(c) potential cation positions vacant. There is only a partial arrangement of the cations since only part of the interstices are filled. The empty cation spaces are randomly distributed over the 24 possible cation positions. When gamma alumina is reacted with lithium, the lithium atoms, being almost identical in size to the aluminum atoms, fill these empty cation spaces to form zeta alumina having a structure almost identical to that of gamma alumina. When the gamma alumina is reacted with sodium or potassium, on the other hand, this is not possible due to the much larger size of these metal atoms. As a result, beta alumina having a distinctly different structure is formed.

The beta aluminas containing sodium and potassium are considered to be true beta aluminas. They give a characteristic diffraction pattern and correspond to the general formula, $R_2O \cdot 11 Al_2O_3$. Their diffraction patterns are substantially but not quite identical due to the difference in the size of the sodium and potassium ions (about 0.95A and 1.33A radius, respectively). For this reason these beta aluminas are designated as sodium beta alumina and potassium beta alumina.

It is also possible to employ the alkaline earth, viz. calcium, strontium or barium, in place of lithium, sodium and potassium. This gives aluminas which, while they do not conform to the above general formula, give the characteristic diffraction pattern of beta alumina. These aluminas, to the use and preparation of which the present invention relates, may therefore be considered as a subclass of beta aluminas.

Due to the different ion sizes of calcium, strontium and barium (0.99A, 1.13A and 1.35A radius, respectively), the diffraction patterns of these beta aluminas differ slightly. See Z. anorg. allg. Chem. 234, 1–16 (1937). They are designated individually as calcium beta alumina, strontium beta alumina and barium beta alumina, respectively. As a subclass they are designated as alkaline earth beta aluminas to distinguish them from the alkali beta aluminas. The alkaline earth beta aluminas cannot be considered as stabilized gamma aluminas. They have a structural arrangement somewhat more complicated than gamma alumina, although the arrangement of the oxygen and aluminum atoms is similar in some respects.

The active beta aluminas employed according to the process of the present invention may be prepared by reacting a gamma alumina of the Haber system with certain compounds of Ca, Sr or Ba. This is effected by contacting the alumina with a suitable compound of Ca, Sr or Ba and heating the mixture at temperatures sufficiently high to cause reaction but insuufficiently high to cause fusion.

Suitable beta aluminas may be prepared starting with any of the gamma aluminas of the Haber system. Since, however, all of these aluminas are converted to gamma alumina before the temperature of reaction is reached, it appears that the reaction, regardless of the form of the alumina originally employed, is in reality between gamma alumina and the alkaline earth metal compound. The alumina is preferably substantially free of impurities such, in particular, as iron. In view of their greater purity the synthetically produced aluminas are generally preferred. In such cases where the alumina is non-adsorptive as in the case of alumina alpha trihydrate and alumina beta trihydrate, it is preferably first activated in the known manner.

In most cases by employing a granular active alumina the beta alumina may be prepared in the form of granules or fragments of suitable size for use in catalysis. In such cases where the alumina is finely divided it may, if desired, be pelleted prior to converting it to the active beta alumina. Also, if desired, the alumina may be finely divided when converted to beta alumina and the finely divided beta alumina subsequently pelleted, if desired with a binder. While the catalysts are usually employed in the form of small fragments or pills of suitable size for fixed bed operation, they may also be applied in the form of a finely divided powder in one of the so-called "fluid catalyst" systems of operation.

The alumina, preferably in the activated form, is preferably treated to remove small amounts of soluble salts such, in particular, as the sodium salts found in the preferred aluminas prepared by precipitation from sodium aluminate solutions. This may be effected in some cases by simply subjecting the alumina to a thorough water washing. A much more effective method is, however, to wash the alumina with a dilute acid solution. Although such acids as phosphoric acid and sulfuric acid may be used, preferred acids are hydrochloric acid, nitric acid, acetic acid, and hydrofluoric acid. The treatment may be simply effected by placing the alumina in a suitable tower and allowing a dilute solution of the acid to slowly pass through the mass at ordinary temperatures. No appreciable solution of the alumina need take place. A still more effective method is to wash the alumina with a dilute (for example, 0.2 N) solution of a decomposable acid salt, such as the nitrate of zirconium or aluminum, preferably aluminum. In this method even traces of soluble impurities are quickly replaced by traces of the applied salt, which then upon subsequent drying and heating is converted to the corresponding non-detrimental oxide while the anion component is volatilized.

The beta aluminas are prepared according to the present invention by reacting the above-described aluminas with suitable compounds of calcium, strontium and/or barium. These three alkaline earth elements all give beta aluminas which are very stable against deterioration at higher temperatures. They are furthermore resistant to the effect of catalytic promoters isomorphous with alpha alumina and to the effect of acid vapors, and are therefore much superior to the hitherto employed aluminas in catalysis. It is found that the calcium beta alumina is somewhat superior in certain respects. This beta alumina is therefore generally preferred.

The alkaline earth compound and the alumina are first brought into intimate contact. This is preferably effected by impregnating the alumina in an activated form with a solution of the alkaline earth compound and then drying whereby the alkaline earth compound is uniformly distributed over the available surface of the alumina. It is also possible to combine the alumina and alkaline earth metal compound in intimate admixture by precipitating the alumina in the presence of a suitable concentration of the alkaline earth compound. Other methods such as co-grinding or the like may also be employed but are generally not preferred.

It is preferred to have the alkaline earth metal present in the form of the oxide before the reaction with the alumina is effected. It is therefore generally preferred to employ the compounds of these metals which may be easily converted to the oxides by heat. Very suitable compounds are, for example, the nitrates and the acetates. These compounds also have the advantage of being water-soluble and therefore easily applied in the form of aqueous solutions.

The chemical constitution of the alkaline earth beta alumina corresponds to the general formula, $3RO \cdot 16Al_2O_3$, wherein R represents an alkaline earth metal, viz. Ca, Sr, Ba. Thus, in the case of the calcium beta alumina the concentration of calcium oxide in the beta alumina is 9.35%. The concentrations of strontium and barium oxides in the corresponding beta aluminas are 16.0% and 22.0%, respectively.

The reaction between the alumina and alkaline earth oxide is topochemical and therefore takes place at a much faster rate on the surface of the alumina than in the interior. Consequently, it is both possible and practical to convert the entire surface of the alumina to a reasonable depth to the desired beta alumina while leaving a certain portion of the inaccessible and therefore unimportant interior of the alumina unreacted. It is therefore not essential that sufficient amounts of the alkaline earth metal compound be present to convert all of the alumina to the corresponding beta alumina. On the other hand, concentrations of alkaline earth metal compound just sufficient to convert the alumina surface to the desired beta alumina are sufficient to afford an alumina which is superior to the original alumina for catalytic purposes. The concentration of alkaline earth metal oxide corresponding to this limiting condition depends upon the surface area of the original alumina and may vary considerably. In certain cases concentrations of calcium oxide (or the corresponding molecular concentrations of the oxides of strontium and barium) as low as about 1.4% B. W. are sufficient to produce superior aluminas. With greater concentrations of the alkaline earth metal oxide the depth of the corresponding beta alumina may be increased until with the theoretical concentrations the entire body of the alumina may be converted. The thermal stability of the alumina is roughly proportional to the depth of the beta alumina. As will be more fully explained below, any excess of the alkaline earth metal oxide as well as any unreacted alkaline earth metal oxide may be removed after the reaction. Appreciable excesses of the desired alkaline earth metal compound may therefore, if desired, be employed. While, as explained, lower and higher concentrations of the alkaline earth metal compound may be employed, it is both convenient and practical to simply impregnate the alumina in one or more steps with a concentrated solution of the desired alkaline earth metal compound in which case about 1.4% to 14% B. W. of the desired metal oxide may usually be easily incorporated.

The reaction of the alumina with the alkaline earth metal oxide is effected by heating the mixture at suitable elevated temperatures. The extent of the reaction depends both upon the temperature and the time of heating. At temperatures below about 900° C. the desired reaction does not take place. At temperatures between about 900° C. and 1000° C., the reaction takes place slowly. At higher temperatures the reaction takes place at very practical rates. From the standpoint of reaction rate it would therefore be desirable to use high temperatures. On the other hand, as the reaction temperature is increased the tendency for the alumina to undergo a loss in surface due to sintering is greatly increased. It is therefore more desirable to effect the reaction at a temperature at which for a given extent of reaction there is a minimum loss of surface. This temperature varies somewhat upon the particular alkaline earth metal used and upon its concentration in the alumina. Generally, temperatures between about 950° C. and 1250° C. are to be preferred.

The time required to effect the desired reaction at these temperatures depends not only upon the particular temperature but also upon the particular alkaline earth metal oxide used, the concentration of the alkaline earth metal oxide present, the intimacy of the mixture of the alumina and alkaline earth metal oxide, the surface area of the alumina, and the extent of reaction desired. By employing a substantial excess of the alkaline earth metal oxide in intimate contact with an alumina having a large surface it is possible when using high temperatures to obtain a surface reaction in a relatively short time, for example, 1 to 3 hours. On the other hand, if it is desired to carry the reaction substantially to completion at low temperatures and with theoretical quantities of the alkaline earth metal oxide, the time of heating is greatly prolonged. Generally, very satisfactory beta aluminas may be produced using the above-described preferred agents, concentrations, etc., by heating at about 1000° C. for about 3 to 20 hours.

After reacting the alumina to form the desired beta alumina, there is often some unreacted alkaline earth metal oxide remaining. The concentration of this material may be appreciable, especially in such cases where a large excess of the alkaline earth metal is originally incorporated and/or the reaction is not carried substantially to completion. This excess alkaline earth metal oxide is usually detrimental in the finished catalyst and is therefore preferably completely or partially removed. This may be easily effected by simply leaching the product with a solvent such, for instance, as dilute acid or a dilute solution of aluminum nitrate. In certain cases, however, as will be pointed out below, this excess of free alkaline earth metal oxide is very beneficial and is preferably left in the catalyst. It is to be particularly pointed out that the alkaline earth metal oxide in the beta alumina becomes part of the alumina structure. It is not leached out by water or dilute acid as are the free uncombined alkaline earth metal compounds. The amount of alkaline earth metal in the alumina is preferably between about 1% and 10% by weight. This corresponds to between about 1.4% and about 14% by weight of calcium oxide.

The beta aluminas prepared as above described retain the mentioned desirable properties and characteristics of the hitherto employed active alumina alpha monohydrate and gamma alumina. From the physical standpoint they have, when properly prepared, a large internal surface and good mechanical strength.

Thus, suitable beta aluminas prepared as described possess an available surface area of at least 20 and usually above 40 square meters per gram. For instance, very active beta aluminas have been prepared according to the described method having available surface areas (as measured by adsorption) in the order of 70 square meters per gram. In most cases the adsorptive ability of the beta alumina so prepared is somewhat lower than that of the gamma alumina due presumably to some growth in the crsytallites during the reaction at the relatively high temperatures employed. With proper care to insure intimate contact of the alkaline earth metal compound and alumina and to avoid overheating, the loss of surface may be maintained, however, at a negligible minimum. From the standpoint of catalytic activity the present beta aluminas exert a similar promoting and stabilizing effect upon the usual catalytic agents customarily employed with alumina. They are much superior to the starting aluminas, however, in certain important respects. Thus, they are much more stable at higher temperatures. The ordinary aluminas, as explained above, revert to the inactive alpha modification when subjected to temperatures in the order of 900° C. or above. The present aluminas, on the other hand, are completely stable at these temperatures. In fact, it is seen that they may be actually subjected during formation to temperatures above those at which ordinary aluminas revert to alpha alumina. The superiority of these aluminas in this respect is illustrated in the examples below.

The above-described beta aluminas may be employed as catalysts per se in place of the conventional alumina catalysts. They are especially advantageous for such processes wherein organic materials are contacted with the aluminas at relatively high temperatures. In such processes as the catalytic reforming, desulfurization, cracking, dehydrogenation, etc., of petroleum fractions, wherein the catalyst is periodically regenerated by burning off combustible deposits, the present active beta aluminas are especially advantageous since this regeneration invariably involves subjecting the alumina for at least a short time to quite high temperatures and is one of the prime causes of the loss of catalytic activity of the less stable catalysts hitherto used.

While the active beta aluminas of the present invention may be employed as catalysts per se, their greatest utility will be in multicomponent catalysts. Thus, for example, the present active beta aluminas are exceptionally advantageous when employed in place of ordinary active alumina in various alumina-base catalysts. In most cases of such multi-component catalysts the alumina serves as a carrier or support and is promoted by a minor amount of a more active agent. Any of the catalytically active promoters conventionally applied to ordinary active alumina may be employed with the improved aluminas of the invention. Thus, a few such representative promoters are the oxides, chromates, molybdates, tungstates, vanadates, chromites, phosphates, phosphites and borates of the metals of the transition series of the periodic system of the elements, particularly those belonging to groups IV, V, VI and VIII of said system. (The elements of the transition series are those elements characterized by having two incomplete electron shells.) Particularly suitable promoters comprise the metal oxides, particularly those exhibiting dehydrogenating activity.

In the preparation of the multi-component catalysts of the present active beta aluminas, the promoter materials may be incorporated with the active beta alumina in the various known manners conventionally used in the preparation of such catalysts with common active alumina. Suitable methods are described, for example, in U. S. Patent No. 2,184,235.

Another important advantage of the present aluminas is that they are substantially inert to the detrimental effect of catalytic promoters containing iron, cobalt, manganese, chromium and similar metals whose oxides are isomorphous with alpha alumina. Consequently, the present beta aluminas are particularly advantageous when combined with promoters comprising these metals. The superiority of these aluminas in this respect is also illustrated in the examples below.

A still further important advantage of the present aluminas in catalysis is that they are substantially immune to the detrimental effect of acid vapors such, in particular, as $MoO_3$. Molybdenum and its compounds are very effective catalytic agents and find a wide and varied application. In most cases at least a portion of the molybdenum occurs, at least temporarily, in the form of $MoO_3$. This oxide is acidic and relatively volatile. When catalysts containing molybdenum in combination with ordinary aluminas are subjected to elevated temperatures, particularly in the presence of air or an oxidizing agent, this acidic oxide causes the rapid conversion of the alumina into the alpha modification. For this reason these molybdena-alumina catalysts, although used on a large scale, are relatively short lived and particularly prone to be deactivated by overheating. These inherent defects of the known molybdena-alumina catalysts have greatly curtailed the extent and scope of their application. When molybdenum compounds such, in particular, as molybdenum oxide are applied to the above-described beta aluminas, these defects are substantially eliminated. The combination of these beta aluminas with molybdenum compounds is therefore considered to be a most important and advantageous embodiment of the invention.

As pointed out above, after heating the mixture of gamma alumina and alkaline earth metal compound to form the corresponding beta alumina, there is usually a small to appreciable excess of alkaline earth metal compound remaining, due either to the use of an excess or to incomplete reaction, or both. In such cases where the beta alumina so formed is to be combined with molybdenum oxide to prepare a molybdena-alumina catalyst, it is found that a small excess of the free alkaline earth metal oxide is advantageous. This alkaline earth metal oxide reacts with a portion of the subsequently deposited molybdenum oxide to form a stable compound which also tends to protect the alumina against the action of $MoO_3$ vapors. The excess free alkaline earth metal oxide should not, however, exceed the concentration of molybdenum oxide subsequently to be applied. We have, furthermore, found that it is possible in this particular case to effect excellent stabilization of the alumina while employing substantially lower temperatures than those recommended above.

As pointed out above, the various metals and metal compounds commonly employed with alumina in catalysts often catalyze the transformation of gamma alumina to alpha alumina. This undesirable property is particularly pronounced in the case of such materials as the oxides of iron, chromium, molybdenum, cobalt, manganese, etc. In view of the tendency for these promoters to catalyze the transformation of gamma alumina to alpha alumina, their presence during the preparation of beta alumina is usually undesirable. As pointed out, the preparation of the beta alumina is executed at temperatures where the transformation of gamma alumina to alpha alumina would normally take place. The success of the preparation of the beta alumina therefore depends upon the much faster rate of the desired reaction, gamma alumina→beta alumina. When promoters which catalyze the transformation of gamma alumina to alpha alumina are present, this reaction may take place in preference to the desired formation of beta alumina. Thus, as pointed out above, the reaction of the alkaline earth metal oxide with the gamma alumina takes place at an appreciable rate only at temperatures above about 900° C. At 900° C., on the other hand, $MoO_3$ readily reacts with gamma alumina to form a molybdenum aluminate which is the first stage in the undesired transformation of the gamma alumina to the alpha form. Thus, although some beta alumina may be formed in the presence of the metal promoters, the product usually contains large amounts of alpha alumina and the catalyst is relatively inactive. For the reasons just explained, the desired metal promoters are preferably incorporated in the catalyst after the conversion to the beta alumina and not before. While this sequence is preferred, it is nevertheless possible to realize an appreciable improvement in certain cases by converting the alumina to the beta alumina in the presence of the supported catalytic promoter. This is more often the case when the catalytic promoter is stable itself and is not isomorphous with alpha alumina. Thus, for example, in the case of supported molybdenum catalysts it is possible to obtain a measure of stabilization if the reaction between the alkaline earth metal oxide and the gamma alumina is effected in a reducing atmosphere. Also, for example, it is possible to effect an appreciable stabilization of conventional chrome-alumina catalysts in this way since chromium oxide, although it catalyzes the transformation of gamma alumina to alpha alumina, is not nearly as active in this respect as $MoO_3$. This is illustrated in Example XVIII below.

As pointed out above, the alkaline earth beta aluminas prepared as described may be used as catalysts per se in place of conventional alumina catalysts but will find widest application when used with one or more active catalyst promoters. It will be apparent therefore that they may be applied in the very wide variety of processes and catalytic conversions in which alumina base catalysts are suitably employed. They are particularly useful and advantageous in the execution of processes such as catalytic dehydrogenation of dehydrogenatable organic compounds, the dehydrocyclization of paraffinic hydrocarbons, the desulfurization of sulfur-bearing hydrocarbon fractions, the dehydro-isomerization of methyl cyclopentane, dimethyl cyclopentane, ethyl cyclopentane, etc., to aromatic hydrocarbons, the destructive hydrogenation of higher molecular weight carbonaceous materials, the oxidation of organic compounds, and the like where relatively high temperatures are either used in the reaction or are encountered during periodic reactivation of the catalyst.

One of the most advantageous applications of the present beta aluminas is in combination with molybdenum oxide in the so-called "hydro-forming" of hydrocarbon materials. This process involves the treatment of normally liquid hydrocarbons with molybdenum oxide catalysts in the presence of substantial amounts of added hydrogen under the following approximate conditions:

Temperature _____ °C__ 425–550
Pressure _____ atm__ 3–100
Liquid hourly space velocity _____ 0.2–2.0
Mol ratio of hydrogen to hydro-
carbon _____ 1:1 to 10:1

The catalyst is periodically regenerated by burning off deposited carbonaceous material.

The following examples which, it is to be understood, are not intended to limit the invention in any way are submitted for the purpose of illustrating various points described above.

EXAMPLE I

A quantity of active gamma alumina in the form of pellets was heated at about 1050° C. for 6 hours. Examination of the product with X-rays showed that the alumina was largely converted into alpha alumina. This example illustrates the relatively poor stability of gamma alumina.

EXAMPLE II

A quantity of active gamma alumina in the form of pellets was soaked in a saturated solution of calcium acetate. The excess solution was drained, the pellets dried, and the calcium acetate decomposed by heating the pellets at about 600° C. for several hours. The calcium oxide-impregnated pellets containing about 5% CaO were then heated at about 1050° C. for 6 hours. The alumina was converted largely to the calcium-beta alumina as shown by the X-ray diffraction pattern. No alpha alumina was formed. This example compared with the above example I illustrates the superior heat stability of the calcium-beta alumina.

EXAMPLE III

Quantities of gamma alumina in the form of pellets were impregnated with about 3%–5% of the oxides of cobalt and manganese, respectively. The samples were then heated at about 1050° C. for 6 hours. Although there was some evidence of the formation of small amounts of spinel, the rest of the alumina was completely transformed into alpha alumina. This example illustrates the ease with which gamma alumina is converted into the alpha modification in the presence of the oxides of cobalt and manganese.

EXAMPLE IV

A quantity of gamma alumina in the form of pellets was impregnated with chromium oxide (9.7% Cr). (This was a commercial chrome-alumina catalyst.) The pellets were heated at 1050° C. for 6 hours. Examination with X-ray showed that the alumina was completely converted into alpha alumina. This example illustrates the effect of chromium oxide in catalyzing the transformation of the alumina base into alpha alumina.

EXAMPLE V

A standard type hydroforming catalyst I was prepared by impregnating pellets of pure activated gamma alumina with molybdenum oxide (8% Mo). The catalyst possessed a specific surface of 83 m.²/gm. (All specific surfaces given herein were measured after the customary reduction of the catalyst with hydrogen at 490° C.) The catalyst so produced, when tested under the following standardized test conditions for the treatment of methyl cyclohexane:

| | |
|---|---|
| Temperature °C | 490 |
| Pressure atms | 20 |
| Liquid hourly space velocity | 0.25 |
| Mol ratio of diluent to hydrocarbon | [1] 5.0 |
| Contact time sec | 100 |
| Process period hrs | 12 |

[1] 50% $H_2$ and 50% natural gas.

gave an average mol per cent of toluene in the liquid product of 87%.

Another standard type hydroforming catalyst II was prepared by impregnating pellets of activated gamma alumina with molybdenum oxide (7.4% Mo). On the standard test the average mol per cent toluene was 89%. After regeneration the average mol per cent toluene was 86%.

A standard commercial hydroforming catalyst III was prepared by impregnating Alorco Activated Alumina-Grade A (consisting essentially of alumina alpha monohydrate) with molybdenum oxide (7.6% Mo). In the standard test the average mol per cent toluene was 85%.

These examples, submitted solely for comparison, illustrate the order of activity under standardized test conditions of the best of the hitherto known and employed hydroforming catalysts.

EXAMPLE VI

A quantity of gamma alumina in the form of pellets was soaked in a saturated solution of calcium acetate. The pellets were dried and then heated at about 600° C. for 3 hours. The concentration of calcium oxide was 1.8% by analysis. The calcium oxide-impregnated pellets were then heated at 800° C. for 118½ hours. No appreciable amount of calcium-beta alumina was formed. When a portion of the same material was heated at about 1000° C. for 7 hours, the calcium-beta alumina was formed. It is seen from this example that in order to produce appreciable amounts of the calcium-beta alumina in a reasonable time, it is necessary to employ temperatures in excess of 800° C.

EXAMPLE VII

A quantity of the alumina containing 1.8% CaO and heated for 118½ hours at 800° C. (Example VI) was used for the preparation of a molybdenum oxide hydroforming catalyst (9.9% Mo). The specific surface of the catalyst was 67 m.²/gm. In the standard activity test the average mol per cent toluene in the product was 85%. It is seen from this example that the mere presence of a small amount of CaO in the catalyst has relatively little effect upon the activity of the catalyst.

EXAMPLE VIII

A quantity of alumina in the form of pellets of active gamma alumina was treated with a 3N solution of aluminum nitrate to remove traces of sodium salts and then drained, dried and heated at 700° C. The alumina was then impregnated with a calcium acetate solution, dried and heated at about 500° C. to decompose the calcium acetate. The alumina containing 2.4% CaO was then heated at 1000° C. for 7 hours to form the calcium-beta alumina. This material was then impregnated with molybdenum oxide (8.7% Mo) in the usual manner. The catalyst so prepared possessed a specific surface of 49 m.²/gm. In the standard test the average mol per cent toluene in the liquid product was 91%.

Another catalyst prepared in the same manner (9.3% Mo) gave 90% average mol per cent toluene in the liquid product in the standard test.

From these examples it is seen that molybdenum oxide in combination with calcium-beta alumina is equally, if not more, active than the combination with gamma alumina.

EXAMPLE IX

A quantity of active alumina in the form of pellets of gamma alumina was freed of traces of sodium salts by treatment with a 0.3N solution of aluminum nitrate. It was then impregnated with 4.1% CaO (via the acetate) and finally heated at 1000° C. for 7 hours to form the calcium-beta alumina. This material was then impregnated with molybdenum oxide (5.5% Mo) in the usual manner. The catalyst so prepared possessed a specific surface of 63 m.²/gm. In the standard test the mol per cent toluene in the liquid product averaged 64%. A second test after regeneration of the catalyst by burning off carbonaceous deposits gave 79 mol % toluene in the liquid product, and a third test after a second regeneration of the catalyst gave 75 mol % toluene. This example illustrates the considerable increase in the conversions regularly noted after the first few regenerations. This increase in conversion is explained as due to a more even distribution of the molybdenum oxide on the calcium-beta alumina which occurs during the regeneration.

EXAMPLE X

A quantity of active alumina in the form of pellets of gamma alumina was freed of traces of sodium salts by treatment with a 0.3N solution of aluminum nitrate. It was then impregnated with CaO via the acetate and finally heated at 1000° C. for 7 hours to form the calcium-beta alumina. In order to remove any unreacted calcium oxide, the material was then washed with a 0.2N solution of aluminum nitrate, dried at 120° C., and then heated at 700° C. for 2 to 3 hours. This material containing about 2.1% of combined CaO was then impregnated with molybdenum oxide (8.0% Mo) in the usual manner. The catalyst so prepared possessed a specific surface of 61 m.²/gm. In the standard test the mol per cent toluene in the liquid product averaged 85%. In a second test after regeneration of the catalyst the average mol per cent toluene in the liquid product was 84% and in a third test after a second regeneration (heated for 7 hours at 600° C. in air) of the catalyst the average mol per cent toluene was 91%. This example likewise illustrates the increased activity noted after one or two regenerations of the catalyst. Furthermore, the example illustrates, when compared with Example V, the high activity of the present catalysts as compared to conventional molybdena-alumina catalysts based either on a weight basis or on a basis of activity per unit surface.

Example XI

A quantity of active alumina in the form of pellets of gamma alumina was freed of traces of sodium salts as described by treatment with a 1N solution of $HNO_3$. It was then impregnated with 4.0% CaO via the acetate and finally heated for 7 hours at 1000° C. to form the calcium-beta alumina. This material was then impregnated with molybdenum oxide (7.6% Mo) in the usual manner. The catalyst so prepared possessed a specific surface of 67 m.²/gm. In the standard test the average mol per cent toluene in the liquid product was 72%. The slightly low conversions obtained with this catalyst are due to an unfavorable ratio of free calcium oxide and molybdenum oxide. The conversion would be increased either by washing excess free unreacted calcium oxide from the catalyst prior to incorporating the molybdenum oxide or by considerably increasing the concentration of molybdenum oxide applied. This is illustrated in the following example.

Example XII

A quantity of active alumina in the form of pellets of pure gamma alumina was impregnated with 3.9% CaO via the acetate and then heated at 1000° C. for 7 hours to form the calcium-beta alumina. This material was then impregnated with molybdenum oxide (13.1% Mo) in the usual manner. In the standard test the average mol per cent toluene in the liquid product was 88%, and after one regeneration, 90%.

Example XIII

A quantity of active gamma alumina in the form of pellets was freed of sodium salts by treatment with a 1N solution of $HNO_3$. The purified pellets were then impregnated with a solution of $Fe(NO_3)_3$ and then heated at about 700° C. for about 2 to 3 hours to convert the iron nitrate to iron oxide. The pellets were then heated for 7 hours at 1000° C. and finally impregnated with molybdenum oxide in the usual manner. The finished catalyst contains 3.26% iron and 8% molybdenum. Examination of the catalyst with X-rays showed that the alumina was entirely converted to the alpha form. In the standard test the average mol per cent toluene in the liquid product was 16%.

This example illustrates the poor activity of the catalyst when the alumina is in the alpha form and also the ease with which gamma alumina is converted into the alpha modification in the presence of iron oxide.

Example XIV

A quantity of active alumina in the form of pellets of gamma alumina was impregnated with 4% SrO via the nitrate and then heated at 1000° C. for 7 hours to form the strontium-beta alumina. This material was then impregnated with molybdenum oxide (7.9% Mo) in the usual manner. In the standard test the average mol per cent toluene in the liquid product was 87%.

Example XV

Samples of various catalysts described above were subjected to severe temperature conditions and then examined with X-rays. The catalysts were:

No. 1. Standard hydroforming catalyst described in Example V—catalyst II.

No. 2. Thermo-stable catalyst described in Example IX.

No. 3. Thermo-stable catalyst described in Example X.

No. 4. Thermo-stable catalyst described in Example XI.

The heat treatments given and the results obtained are tabulated in the following Table I:

Table I

| Catalyst | Heat Treatment | Results |
|---|---|---|
| 1 | 1,000° C.—6 hrs. | Alumina completely converted to alpha alumina. |
| 1 | 900° C.—6 hrs. | Most of the alumina converted to alpha alumina. |
| 1 | 800° C.—6 hrs. | The first step in the conversion of the alumina to alpha alumina, namely, the formation of a $MoO_3$-$Al_2O_3$ compound, took place. |
| 2 | 1,000° C.—6 hrs. | No alpha alumina formed. |
| 3 | 1,000° C.—6 hrs. | Some alpha alumina formed. |
| 3 | 900° C.—6 hrs. | No alpha alumina formed. |
| 4 | 1,000° C.—6 hrs. | Some alpha alumina formed. |
| 4 | 900° C.—6 hrs. | No alpha alumina formed. |

Example XVI

Samples of various catalysts, most of which are described above, were subjected to severe heat treatments and then tested for catalytic activity in the above-described standard test. The catalysts tested were as follows:

No. 1. The standard type catalyst described in Example V—catalyst II—which was heated at 680° C. for 6 hours in air prior to the test.

No. 2. The standard type catalyst described in Example V—catalyst II— which was heated at 800° C. for 6 hours in air prior to the test.

No. 3. The standard type catalyst described in Example V—catalyst III— which was heated at 800° C. for 6 hours in air prior to the test.

No. 4. A commercial hydroforming catalyst which was heated at 800° C. for 6 hours in air prior to the test. This catalyst contained 4.94% Mo and is said to be prepared with Alorco Activated Alumina. In the standard test the fresh catalyst gave 90 average mol per cent toluene in the liquid product.

No. 5. A standard type catalyst which was heated at 800° C. for 6 hours in air prior to the test. This catalyst was prepared by impregnating pellets of gamma alumina with molybdenum oxide (8% Mo). In a five-hour test period under the described standard test conditions the fresh catalyst gave 90 average mol per cent toluene in the liquid product.

No. 6. A standard type catalyst which was heated at 800° C. for 6 hours in air prior to the test. This catalyst was prepared by impregnating pellets of gamma alumina with molybdenum oxide (8% Mo). In the standard test the average mol per cent toluene in the liquid product with the fresh catalyst was 93%.

No. 7. The thermo-stable catalyst described in Example X which was heated at 700° C. for 6 hours in air prior to the test.

No. 8. The thermo-stable catalyst described in Example X which was heated at 800° C. for 6 hours in air prior to the test.

No. 9. The thermo-stable catalyst described in Example IX which was heated at 700° C. for 6 hours in air prior to the test.

No. 10. The thrmo-stable catalyst described in Example IX which was heated at 800° C. for 6 hours in air prior to the test.

The activities expressed as mol per cents of toluene in the liquid products over a 12-hour process period are tabulated in the following Table II:

*Table II*

| Time | Catalyst | | | | | | | | | |
|---|---|---|---|---|---|---|---|---|---|---|
| | 1 | 2 | 3 | 4 | 5 | 6 | 7 | 8 | 9 | 10 |
| 1 hr | 87 | 58 | 33 | 48 | 60 | 17 | 93 | 84 | 75 | 72 |
| 2 hrs | 87 | 44 | 25 | 44 | 53 | 10 | 92 | 84 | 75 | 72 |
| 4 hrs | 87 | 30 | 21 | 40 | 48 | 8 | 92 | 83 | 75 | 72 |
| 8 hrs | 86 | 19 | 17 | | | 7 | 91 | 83 | 74 | 72 |
| 12 hrs | 86 | 16 | | | | 4 | 91 | 82 | 74 | 72 |

From inspection of Table II it is seen that the standard type catalyst No. 1 was not materially affected by heating at 680° C. for 6 hours but was seriously deactivated by heating at 800° C. for 6 hours. All of the other commercial and standard type catalysts were seriously deactivated by the heat treatment applied. The thermo-stable catalysts, on the other hand, were substantially not affected by the severe heat treatments. Thus, the thermo-stable catalyst of Example X after heating at 700° C. for 6 hours was much superior to all of the fresh standard catalysts and after being heated at 800° C. for 6 hours was substantially equivalent to the fresh standard catalysts. The thermo-stable catalyst of Example IX, although somewhat lower in activity due to an insufficient ratio of molybdenum oxide to free calcium oxide, was exceptionally stable, even under the drastic heat treatments applied.

EXAMPLE XVII

A quantity of alumina in the form of pellets of active gamma alumina was freed of traces of sodium salts by treatment with a dilute solution of aluminum nitrate as described and then impregnated with barium oxide via the nitrate, and then finally heated at 1000° C. for 7 hours to form the barium-beta alumina. In order to remove any unreacted barium oxide, this material was then washed with a solution of aluminum nitrate, drained, dried, and finally heated at 700° C.–750° C. for 2 to 3 hours. This material containing about 1.0% of combined barium oxide was then impregnated with molybdenum oxide (8.1% Mo) in the usual manner.

In the standard test the average mol per cent toluene in the liquid product was 83%.

EXAMPLE XVIII

As shown in Example IV, heating a commercial chrome-alumina catalyst at 1050° C. for 6 hours results in a complete conversion of the alumina support into alpha alumina. This transformation of the alumina results in an almost complete deactivation of the catalyst. A portion of the same catalyst described in Example IV was impregnated with about 4% CaO and then heated at 1050° C. for 6 hours. Examination by X-ray showed that substantially no alpha alumina was formed. A portion of the catalyst was then heated at 1200° C. for 118½ hours. Examination by X-ray showed that the alumina was largely converted to the alpha modification. From this example it is seen that, although complete stabilization of the catalyst was not obtained, this less preferred treatment did effect a substantial improvement in the catalyst.

This application is a continuation-in-part of our copending application Serial No. 434,630, filed March 14, 1942.

In the foregoing and in the following claims the expression "alkaline earth metals" is defined as the bivalent elements Ca, Sr, Ba of the second group of the periodic system.

We claim as our invention:

1. An adsorptive alumina compound suitable for use in catalysis having a specific surface of at least 40 square meters per gram showing the X-ray diffraction pattern of a beta alumina of the general formula $3RO \cdot 16Al_2O_3$ wherein R represents an alkaline earth metal prepared by impregnating an adsorptive gamma alumina of the Haber system with from about 1% to about 10% of an alkaline earth metal in the form of a compound capable of being converted to the oxide by heating, and heating the mixture at a temperature between about 950° C. and 1250° C.

2. An adsorptive alumina compound suitable for use in catalysis having a specific surface of at least 40 square meters per gram showing the X-ray diffraction pattern of a beta alumina of the formula $3CaO \cdot 16Al_2O_3$ prepared by impregnating an adsorptive gamma alumina of the Haber system with from about 1% to about 10% of calcium in the form of a compound capable of being converted to the oxide by heating, and heating the mixture at a temperature between about 950° C. and 1250° C.

3. An adsorptive alumina compound suitable for use in catalysis having a specific surface of at least 40 square meters per gram showing the X-ray diffraction pattern of a beta alumina of the formula $3BaO \cdot 16Al_2O_3$ prepared by impregnating an adsorptive gamma alumina of the Haber system with from about 1% to about 10% of barium in the form of a compound capable of being converted to the oxide by heating, and heating the mixture at a temperature between about 950° C. and 1250° C.

4. An adsorptive alumina compound suitable for use in catalysis having a specific surface of at least 40 square meters per gram showing the X-ray diffraction pattern of a beta alumina of the formula $3SrO \cdot 16Al_2O_3$ prepared by impregnating an adsorptive gamma alumina of the Haber system with from about 1% to about 10% of strontium in the form of a compound capable of being converted to the oxide by heating, and heating the mixture at a temperature between about 950° C. and 1250° C.

5. A process for the preparation of an adsorptive alumina compound showing the X-ray diffraction pattern of a beta alumina of the general formula $3RO \cdot 16Al_2O_3$ wherein R represents an alkaline earth metal, which comprises impregnating an adsorptive gamma alumina of the Haber system with from about 1% to about 10% of an alkaline earth metal in the form of a compound capable of being converted to the oxide by heat, and heating the mixture at a temperature between about 950° C. and 1250° C.

6. A process for the preparation of an adsorptive alumina compound showing the X-ray diffraction pattern of a beta alumina of the formula 3CaO·16Al₂O₃, which comprises impregnating an adsorptive gamma alumina of the Haber system with from about 1% to about 10% of calcium in the form of a compound capable of being converted to the oxide by heat, and heating the mixture at a temperature between about 950° C. and 1250° C.

7. Process according to claim 6 further characterized in that the alumina compound after said heating is treated with a dilute acid solution to remove free unreacted calcium oxide.

8. A process for the preparation of catalysts having enhanced stability against loss of activity at higher temperatures which comprises reacting a gamma alumina of the Haber system with an oxide of an alkaline earth metal at a temperature between about 950° C. and 1250° C. for a time sufficient to convert at least the surface into the corresponding alkaline earth beta alumina of the general formula $3RO \cdot 16Al_2O_3$ wherein R represents the alkaline earth metal, and incorporating a relatively more active catalytic promoter on said surface.

9. The process according to claim 8 further characterized in that the gamma alumina prior to reacting with the alkaline earth metal oxide is treated with a dilute acid solution to remove soluble sodium salts.

10. The process according to claim 8 further characterized in that the alkaline earth-beta alumina prior to incorporating the relatively more active catalytic promoter is treated with a dilute acid solution to remove free unreacted alkaline earth metal oxide.

11. Process according to claim 6, further characterized in that the adsorptive gamma alumina is first treated with a dilute acid solution to remove small amounts of soluble salts prior to incorporating the alkaline earth metal compound.

12. A process for the preparation of catalysts having enhanced stability against loss of activity at high temperatures which comprises impregnating an adsorptive gamma alumina of the Haber system with from about 1% to about 10% of an alkaline earth metal in the form of a compound capable of being converted to the oxide by heating, heating the mixture at a temperature between about 950° C. and 1250° C. for a time to convert at least the surface into the corresponding alkaline earth beta alumina of the general formula $3RO \cdot 16Al_2O_3$, wherein R represents the alkaline earth metal, and thereafter incorporating a catalytic compound of molybdenum on said surface.

13. A catalyst consisting essentially of a catalytically active compound of molybdenum and an adsorptive alumina showing the X-ray diffraction pattern of a beta alumina of the general formula $3RO \cdot 16Al_2O_3$, wherein R represents an alkaline earth metal, said catalyst being prepared according to the method of claim 12.

14. A process for the catalytic dehydrogenation of a dehydrogenatable hydrocarbon wherein the catalyst is periodically regenerated by burning deposited carbonaceous materials therefrom which comprises contacting the hydrocarbon to be dehydrogenated under dehydrogenation conditions with a catalyst composite comprising a dehydrogenating promoter of relatively high activity incorporated on the surface of an adsorptive alumina compound prepared by impregnating an adsorptive gamma alumina of the Haber system with from about 1% to about 10% of an alkaline earth metal in the form of a compound capable of being converted to the oxide by heating, heating the mixture at a temperature between about 950° C. and 1250° C. for a time to convert at least the surface into the corresponding alkaline earth beta alumina of the general formula $3RO \cdot 16Al_2O_3$, wherein R represents the alkaline earth metal, and thereafter incorporating said dehydrogenating promoter on said surface.

15. A process for the catalytic hydroforming of a hydrocarbon fraction with periodic regeneration of the catalyst by burning deposited carbonaceous materials therefrom which comprises contacting the hydrocarbon fraction to be hydroformed under hydroforming conditions selected within the following limits:

Temperature _____° C__ 425–455
Pressure _____atmospheres__ 3–100
Liquid hourly space velocity_____ 0.2–2.0
Mol ratio of hydrogen to hydrocarbon _____ 1:1 to 10:1 with a catalyst composite comprising molybdenum oxide incorporated on the surface of an adsorptive alumina compound prepared by impregnating an adsorptive gamma alumina of the Haber system with from about 1% to about 10% of an alkaline earth metal in the form of a compound capable of being converted to the oxide by heating, heating the mixture at a temperature between about 950° C. and 1250° C. for a time to convert at least the surface into the corresponding alkaline earth beta alumina of the general formula $3RO \cdot 16Al_2O_3$, wherein R represents the alkaline earth metal and thereafter incorporating said dehydrogenating promoter on said surface.

16. A process for the catalytic hydroforming of a hydrocarbon fraction with periodic regeneration of the catalyst by burning deposited carbonaceous materials therefrom which comprises contacting the hydrocarbon fraction to be hydroformed under hydroforming conditions selected within the following limits:

Temperature _____ 425° C.–455° C.
Pressure _____ 3–100 atmospheres
Liquid hourly space velocity_____ 0.2–2.0
Mol ratio of hydrogen to hydrocarbon _____ 1:1 to 10:1 with a catalyst composite comprising molybdenum oxide incorporated on the surface of an adsorptive alumina compound prepared by impregnating an adsorptive gamma alumina of the Haber system with from about 1% to about 10% of calcium in the form of a compound capable of being converted to the oxide by heating, heating the mixture at a temperature between about 950° C. and 1250° C. for a time to convert at least the surface into calcium beta alumina of the general formula $3CaO \cdot 16Al_2O_3$ and thereafter incorporating the molybdenum oxide on said surface.

ALBERT E. SMITH.
OTTO A. BEECK.

REFERENCES CITED

The following references are of record in the file of this patent:

UNITED STATES PATENTS

| Number | Name | Date |
|---|---|---|
| 1,732,381 | Schmidt | Oct. 22, 1929 |

(Other references on following page)

| Number | Name | Date |
|---|---|---|
| 2,038,566 | Huettner et al. | Apr. 28, 1936 |
| 2,209,458 | Heard et al. | July 30, 1940 |
| 2,279,703 | Bradley et al. | Apr. 14, 1942 |
| 2,304,168 | Heard | Dec. 8, 1942 |
| 1,778,517 | Benner et al. | Oct. 14, 1930 |
| 2,229,353 | Thomas et al. | Jan. 21, 1941 |
| 2,231,446 | Grosse | Feb. 11, 1941 |
| 2,279,198 | Huppke | Apr. 7, 1942 |
| 2,112,931 | Schulze | Apr. 5, 1938 |
| 2,249,767 | Kistler | July 21, 1941 |
| 2,209,908 | Weiss | July 30, 1940 |
| 2,206,377 | Weiss | July 2, 1940 |
| 2,216,262 | Block et al. | Oct. 1, 1940 |
| 1,913,938 | Metzger et al. | June 13, 1933 |
| 2,056,915 | Wulff | Oct. 6, 1936 |
| 2,172,534 | Grosse | Sept. 12, 1939 |
| 2,311,979 | Corson | Feb. 23, 1943 |
| 2,322,863 | Marschner et al. | June 29, 1943 |
| 2,184,235 | Groll et al. | Dec. 19, 1939 |
| 2,239,337 | Visser et al. | July 15, 1941 |
| 2,278,223 | Sturgeon | Mar. 31, 1942 |
| 2,344,330 | Sturgeon | Mar. 14, 1944 |
| 2,371,087 | Webb et al. | Mar. 6, 1945 |

FOREIGN PATENTS

| Number | Country | Date |
|---|---|---|
| 31,699 | Norway | Feb. 7, 1921 |

OTHER REFERENCES

Edwards et al., "The Aluminum Industry," vol. 1, pages 164–168. (Copy in Division 3.)

Chemical Abstracts, 32, 8908 (1938), Edwards et al., "The Aluminum Industry," McGraw-Hill 1930, vol. I, pages 144 and 153. (Copy in Div. 3.)

Mellor, "Inorganic and Theoretical Chemistry," vol. 5, pages 289 through 294. (Copy in Division 59.)